June 4, 1957
C. G. KIRKBRIDE
2,794,709
PREPARATION OF CARBON BLACK AND HYDROGEN
Filed Dec. 20, 1952
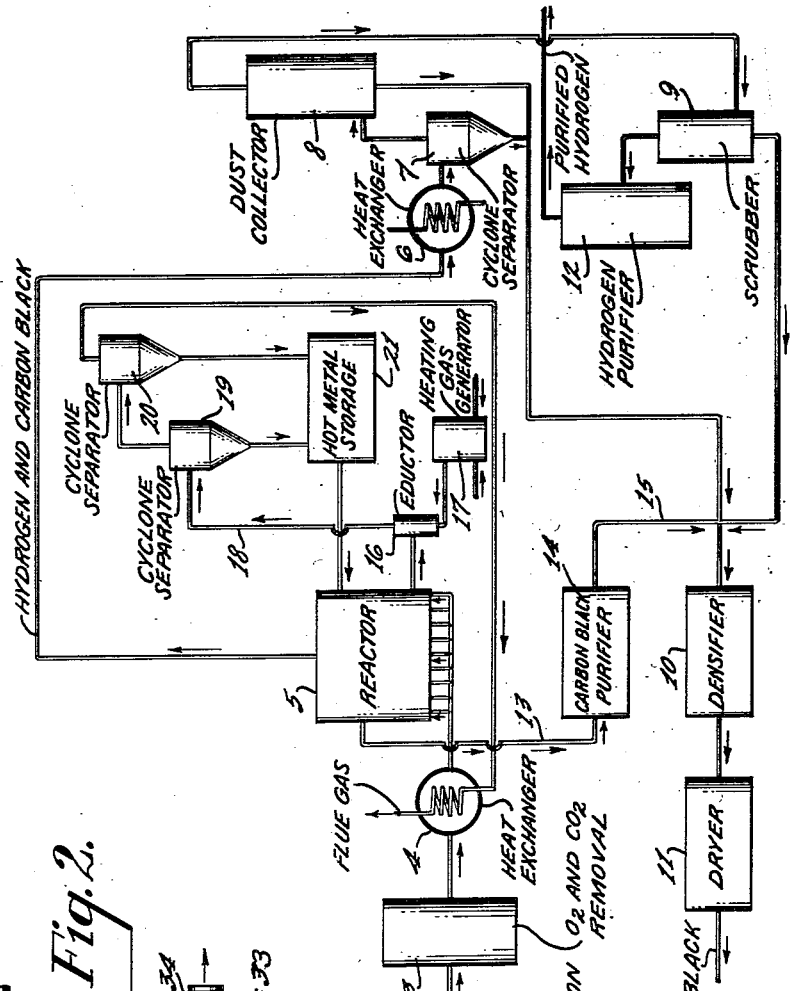
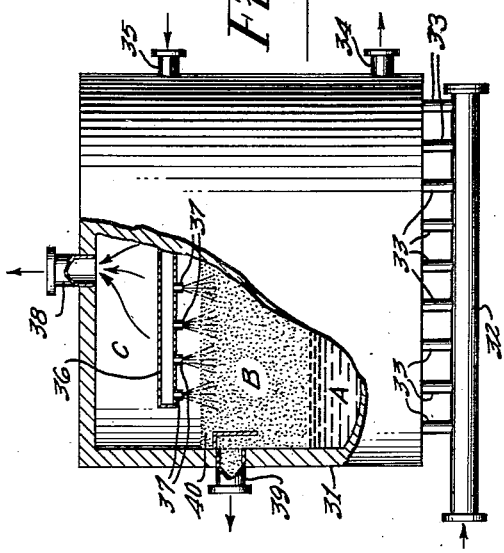
INVENTOR.
Chalmer G. Kirkbride
BY
ATTORNEY United States Patent Office 2,794,709
Patented June 4, 1957

2,794,709

PREPARATION OF CARBON BLACK AND HYDROGEN

Chalmer G. Kirkbride, Wallingford, Pa., assignor to Houdry Process Corporation, Wilmington, Del., a corporation of Delaware Application December 20, 1952, Serial No. 327,095

8 Claims. (Cl. 23—209.4)

This invention relates to the preparation of carbon black and hydrogen. More particularly, the invention is directed to the preparation of carbon black and hydrogen by the decomposition of normally gaseous hydrocarbons; more especially those found in natural gas.

Normally gaseous hydrocarbons and particularly methane have a relatively low market value as such and the conversion of these materials into products of greater value is a matter of considerable interest to those dealing with these materials. While most of the natural gas is utilized for fuel purposes, a considerable amount of it is used in processes wherein it is decomposed by a variety of means to produce carbon black and hydrogen. These products have an appreciably greater value than the raw materials inasmuch as the carbon black may be employed in the rubber, paint and ink industries as well as in the preparation of carbon electrodes such as are used in the electrolytic manufacture of metals. Hydrogen has its uses in the synthetic ammonia industry, in vegetable oil hydrogenation and in various hydrogenation processes in the petroleum industry.

Many types of processes have been suggested to effect the decomposition of lighter hydrocarbons to the basic components of carbon and hydrogen. Most of these processes have disadvantages of one nature or another and very few, if any, are completely satisfactory for the production of low cost and high purity hydrogen.

Theoretically both carbon and hydrogen can be produced in high yield and with high purity by cracking natural gas or light hydrocarbons in the absence of other gases by reactions such as the following: $CH_4 = C + 2H_2$ and $C_2H_6 = 2C + 3H_2$. In actual practice the attainment of such theoretical yields is made difficult because of several complicating factors including the difficulties of heat transfer problems on plant scale for this highly endothermic reaction, the high temperatures involved particularly in the purely thermal reactions whereby severe demands on materials of construction make plant operation difficult, and probably more serious is that the carbon produced tends to deposit on solid surfaces in the systems and thereby causes blocking of the apparatus in such manner that continuous operation may be substantially impossible. In connection with this latter difficulty, when solid catalytic agents are used, the surface of such agents is covered with the carbon deposit and a loss of catalyst activity is fairly rapid and serious so that some regenerative process is periodically necessary.

Because of these and other similar problems, no truly continuous method of decomposing lighter hydrocarbons in the absence of air has been developed to a commercially attractive level. The thermal decomposition process, commonly called furnace thermal process, utilizes a cyclic operation with regenerative type furnaces. In these furnaces hot checkerwork packing supplies the heat for the decomposition. However, in such systems over 50% of the carbon is lost on the checkerwork and as an additional drawback the product gas is contaminated to considerable extent with the flue gas from the regeneration and heating cycle. While such product gas is utilized for ammonia synthesis, a product gas with less contamination is an economic desirability. The carbon blacks obtained from these operations are of relatively high purity and are sufficiently pure as produced to avoid the necessity of some further purification step. The relatively low yields, however, are naturally a drawback to desirability of such operations.

Other pyrolytic processes for the production of carbon black include the furnace combustion process and the channel process. In each of these types air is added with the light hydrocarbons and part of the hydrocarbon charge is oxidized to furnish the heat for the decomposition of the remainder of the hydrocarbon. Naturally the large amounts of nitrogen introduced with the air make these processes unsuitable for the production of commercially acceptable hydrogen gas. While to some extent the disadvatages of these processes may be overcome by the use of pure oxygen, the cost of pure oxygen is practically prohibitive and the resultant gas is still contaminated with relatively large amounts of carbon monoxide and to some extent carbon dioxide.

Other processes are employed such as for the production of synthesis gas comprising hydrogen and carbon monoxide wherein the formation of carbon is avoided by reacting steam and the lighter hydrocarbons at elevated temperatures. In view of the fact that substantially no carbon is produced in such reaction, catalytic processes have been found quite satisfactory. In these processes, the use of pure oxygen has been found advantageous as a means of supplying heat by exothermic reaction and heat balanced operation may be approached with resultant simplification of reactor requirements. However, in this instance, as in the previous instances, the high cost of oxygen and mechanical difficulties very shortly overcome the advantages of such an operation. Further, in such processes if it is desired to use the product gas as a source of pure hydrogen as for hydrogenation purposes, all of the carbon monoxide must be removed inasmuch as carbon monoxide is a severe poison for many of the hydrogenation catalysts. For purposes other than the removal of traces of carbon monoxide such gas purification systems can be extremely complex and expensive.

It has now been found that many of the difficulties and disadvantages of the existing processes can be overcome by operating in accordance with the invention hereinafter described more fully. It has been found that substantially pure carbon black and hydrogen can be obtained from lighter hydrocarbons with relative simplicity and desirable economic aspects.

In accordance with this invention normally gaseous hydrocarbons are preheated to reaction temperature by contact with a bath of molten metal or salt followed by substantially complete decomposition to the components carbon and hydrogen by further contact with a hot fluidized bed of carbon particles supported immediately above the molten material, with subsequent recovery of the product carbon and hydrogen.

In the operation of this invention both carbon and hydrogen are produced with its economic advantages in thus obtaining substantially all of the available carbon and hydrogen in relatively pure usable form. The fouling in the system of either the apparatus or any contact mass therein with carbon is eliminated by the type and method of this operation. Nearly quantitative yields of carbon and hydrogen are obtained, thus utilizing the hydrocarbon charge with a high efficiency. Cyclic operation in the ordinary sense of the word is avoided, and the elimination of flue gas from the reaction zone is obtained without difficulty.

Better understanding of the operation of this invention is possible through reference to the attached drawing and the detailed description thereof as appearing hereinafter.

In the drawing,

Figure 1 is a flow diagram of a typical plant operation in accordance with this invention; and Figure 2 is a view in elevation, partly cut away, of a typical reactor of the size and type useful in connection with the operation of the embodiment hereinafter described.

Returning now to Figure 1 for a more detailed description of the operation, an embodiment is presented as it applies to the introduction of natural gas charge at a rate of 400 volumes per volume of contact carbon in the reactor per hour. Inasmuch as the natural gas may contain impurities including relatively small quantities of sulfur compounds, oxygen, nitrogen, carbon dioxide and water vapor, it is desirable to secure the elimination of such impurities either prior to the decomposition of the natural gas or from the product gases. As shown in Figure 1, the removal of most of these impurities is effected before introduction of the charge into the reactor. Thus, the natural gas charge is initially passed through a desulfurization zone as indicated at 1 wherein other contaminants such as nitrogen compounds may also be removed, and thence successively through a dehydration zone 2 and through a zone 3 for the removal of oxygen and carbon dioxide. The thus purified charge then passes in indirect heat exchange with hot flue gases to utilize more efficiently some of the heat in the system as in a heat exchanger 4, and is thereafter introduced at a multiplicity of points upwardly into the reactor 5. In the bottom of reactor 5 is a bath of molten material through which the charge gases pass with resultant heating to decomposition temperature.

These heated gases continue their upward motion and in so doing enter into and pass through a fluidized bed of carbon particles which is in turn fluidized by the motion of such gases passing therethrough which move at a superficial velocity of about two feet per second. The product gas and such fine carbon particles as may be suspended therein leave the top of the reactor and after passing through a heat exchanger 6 thereafter enter a suitable separating system wherein the carbon and the gas are separated.

In the system shown here, this separating system includes a cyclone separator 7 wherein by centrifugal action the larger particles of carbon are separated from the gas which thereafter passes into a dust collector 8 such as a bag filter system in which most of the finer particles are removed and from there into a suitable scrubber 9 where the last traces of solid materials are elutriated from the gas stream. The carbon particles collected from each of the components of the separating system are passed in a moistened condition to a densifier 10 wherein the otherwise light and fluffy carbon is compacted as into granules or pellets which are subsequently dried as in 11 and removed from the system, as to storage, in a desired non-dusting form.

The hydrogen-containing gas thus freed of solid materials is passed through suitable purification means 12 which may include provisions for the removal of traces of carbon monoxide and is then removed from the system to storage as commercially acceptable hydrogen.

An additional source of carbon added to the carbon stream prior to admission to the densification step is that withdrawn from the fluidized bed of carbon particles in the reactor system. Inasmuch as all of the carbon produced in the reaction zone is not removed in the gas stream, there is appreciable accumulation of carbon in the fluidized section and to obtain the advantages of collecting this carbon and to prevent the buildup of carbon and thus increasing the size of the fluidized bed to an inoperable level provision is made, as diagrammatically indicated at line 13, purifier 14 and line 15 whereby suitable amounts of carbon comprising the fluidized bed is withdrawn and introduced into the carbon stream for processing as described above.

As is shown diagrammatically in Figure 1, an eductor 16 is associated with the reactor whereby the molten metal from the molten metal bath is withdrawn and contacted with hot gases from a heating gas generator 17 and is simultaneously elevated through suitable equipment such as line 18 and cyclone separators 19 and 20, wherein such purification as may be necessary is effected, into a suitable storage vessel 21 from which it returns by gravity flow into the reactor system for distribution therein and described more fully hereinafter in connection with Figure 2.

Referring now to Figure 2, there is shown in detail an elevation of the reactor with the cut-away section. In Figure 2 the reactor vessel itself is indicated at 31 and comprises a suitable temperature and reaction resistant vessel 10 feet in inside diameter and 9 feet inside height in which approximately one-third is occupied by the molten metal bath indicated at A; one-third is occupied by the fluidized bed of carbon as indicated at B; and the top third is the space above the fluidized bed wherein an appreciable amount of disengagement of the gases from the solids is effected and is generally indicated as C. Charge gas enters distributing manifold 32 and passes upwardly therefrom through distributing members 33 into the lower region of the molten metal bath A for flow and heating during passage therethrough. The molten metal may be a single metal, an alloy or a slurry formed by the powder of one metal suspended in another metal or alloy. Instead of molten metal there may be employed thermally stable nonreactive mineral salts, particularly alkali metal chlorides and borates, for example borax. The metal bath contemplated in the present system comprises 70% copper and 30% tin which combination has a relatively low vapor pressure at the conditions of operation. In general this molten bath is at a temperature of about 1800° F. and the metal withdrawn through outlet line 34 for passage to the eductor for reheating is generally at this temperature. The reheated molten metal is introduced through line 35 at a temperature of approximately 2000° F. and passes into ceramic distributing member 36 which is provided with nozzles or openings 37 through which the molten metal is discharged into the reaction zone as a spray which passes downwardly through the fluidized carbon bed providing the necessary heat by direct and indirect exchange to promote the decomposition, which is endothermic in nature, of the hydrocarbons. Product gases containing greater or less amounts of suspended carbon are withdrawn from the system through outlet 38 and transferred to the separating system. Through opening 39 which may be baffled in suitable manner as shown at 40, the level of the fluidized carbon in bed B is maintained by the withdrawal of the appropriate amounts of carbon.

By operating in the manner with equipment generally described above, there are obtained products which include approximately 40 tons per day of carbon black and the hydrogen-containing gas in which the hydrogen amounts to upwards of 90% (vol.) and the residual material comprises mostly methane.

It is to be understood that the process hereinabove described is indicative of an embodiment of operation and as such should not be held limiting. As previously indicated, substantially all of the purification of the final hydrogen-containing stream may be utilized as substantially the only purifying means which may eliminate the necessity or the desirability of subjecting the original charge to any form of purification. Likewise the carbon product may be used directly as recovered if so desired or may be submitted in toto or in part to some suitable purification treatment such as indicated in Figure 1 wherein carbon from the reactor directly may be treated to remove any entrained metal which may be contained therein. Also contemplated are the possibilities of maintaining the desired heat in the molten metal system by means other than those indicated and further in effecting the purification of the metal. Likewise the decomposition ability of the molten metal bath may be enhanced by the inclusion therein of a metal or metals having catalytic activity for the decomposition of the hydrocarbons passed therethrough.

Considerable leeway is likewise contemplated in connection with the form of the reaction vessel and its associated elements. Thus the gaseous charge may be introduced not only as shown in Figure 2 but may be introduced from a manifolding system wherein multiple inlets substantially uniformly distributed across the cross-sectional area of the bottom of the reaction vessel may be employed. Similarly, distributing system 36 with its associated nozzle member 37 may be made of material other than a ceramic, such as for example of carbon or graphite. Also, this distributing system may have form other than is shown in Figure 2 and may be in the form of a ring or multiple rings or of the typical spider formation or other suitable configuration whereby relatively uniform distribution of the molten metal may be obtained when introduced into and through the fluidized carbon bed and from thence into the molten metal bath below. It is also contemplated, however as a less desirable embodiment, that the heated metal return may be directly into the molten bath.

Obviously many modifications and variations of the invention as hereinbefore set forth may be made without departing from the spirit and scope thereof and therefore only such limitations should be imposed as are indicated in the appended claims.

I claim:

1. The process for the pyrolytic decomposition of normally gaseous hydrocarbons to good yields of carbon and hydrogen comprising introducing such a hydrocarbon feed into direct heat exchange contact with a pool of molten material, continuing said contact and elevating the temperature of said charge to reaction temperature, passing thus heated charge upwardly into contact with a layer of hot fluidized carbon at hydrocarbon decomposition temperature, effecting decomposition of said charge to carbon and hydrogen during said last mentioned contact, and recovering products of said decomposition, while continuously maintaining said layer of carbon in fluidized condition above said molten material.

2. The process for the pyrolytic decomposition of normally gaseous hydrocarbons to substantially only their constituents of carbon and hydrogen comprising preheating to reaction temperature such a hydrocarbon feed by contact with a molten metal bath, effecting decomposition of such preheated feed by subsequent contact with a hot fluidized bed of carbon particles supported immediately above said bath, said carbon particles having a temperature above the decomposition temperature of said gaseous hydrocarbons, maintaining said bed in fluidized condition by the action of the feed and product gases, and separating and recovering product carbon and hydrogen.

3. The process for the decomposition of natural gas comprising preheating such a natural gas charge to a temperature in the order of 1800° F. by contact with molten material, passing such preheated charge directly into further contact with a fluidized bed of carbon particles maintained at temperature in the range of 1800–2000° F., effecting pyrolytic decomposition of said preheated charge to hydrogen and carbon during said further contact, and separating and recovering product carbon and hydrogen.

4. The process for the decomposition of normally gaseous hydrocarbons in natural gas comprising subjecting such a charge gas to pretreatment to effect substantially complete removal of sulfur and oxygen compounds, passing said pretreated charge in indirect heat exchange with a heat supplying fluid to obtain partial preheating, passing such partially preheated charge into direct heat exchange contact with molten metal having a temperature of at least 1800° F. and effecting thereby heating of such charge to reaction temperature, passing said charge at reaction temperature directly into contact with a fluidized bed of carbon particles having a temperature higher than said molten metal and effecting by said last mentioned contact decomposition of said charge to carbon and hydrogen, withdrawing only such carbon from said decomposition to maintain the amount of carbon in said fluidized bed substantially constant, and separately removing and recovering hydrogen from said decomposition.

5. The process in accordance with claim 4 wherein said withdrawn carbon is composed in part of carbon removed in and subsequently separated from said removed hydrogen, and in part of carbon removed directly from said fluidized bed.

6. The process for the pyrolytic decomposition of normally gaseous hydrocarbons to substantially only its constituents of carbon and hydrogen comprising preheating to reaction temperature such a hydrocarbon feed by contact with a molten salt bath, effecting decomposition of such preheated feed by subsequent contact with a hot fluidized bed of carbon particles, said bed having a temperature above the decomposition temperature of said preheated feed, maintaining said bed in fluidized condition immediately above said bath by the action of the feed and product gases, and separating and recovering product carbon and hydrogen.

7. The process for the pyrolytic decomposition of normally gaseous hydrocarbons to good yields of carbon and hydrogen comprising introducing such hydrocarbons into direct heat exchange contact with a layer of molten material maintained at elevated temperature sufficient to initiate decomposition of such hydrocarbons, continuing said contact for a period sufficient to raise the temperature of said hydrocarbons to decomposition temperature and to initiate such decomposition, passing the thus heated hydrocarbons upwardly into a layer of hot fluidized carbon having a temperature above said decomposition temperature thereby further decomposing said hydrocarbons to form carbon and hydrogen, and recovering products of said decomposition.

8. Process for the pyrolytic decomposition of normally gaseous hydrocarbons which comprises, preheating a charge gas to decomposition temperature by direct heat exchange with a molten material bath, subsequently decomposing said gas by further contact with a fluidized bed of hot carbon having a temperature higher than said decomposition temperature and supported immediately above said molten bath, the heat required for such decomposition being supplied by, continuously removing a portion of said molten bath, heating said removed portion to a temperature above 1800° F., and reintroducing such heated portion as a downwardly moving spray from above said fluidized bed into heat exchange relation with said fluidized bed.

References Cited in the file of this patent

UNITED STATES PATENTS

| 1,107,926 | Frank | Aug. 18, 1914 |
| 1,392,788 | Paris | Oct. 4, 1921 |
| 1,418,385 | Masson | June 6, 1922 |
| 1,756,877 | Paris | Apr. 29, 1930 |
| 1,984,380 | Odell | Dec. 18, 1934 |
| 2,458,996 | Kinney et al. | Jan. 11, 1949 |
| 2,562,813 | Ogorazly et al. | July 31, 1951 |
| 2,595,254 | Hemminger | May 6, 1952 |

FOREIGN PATENTS

| 328,048 | Great Britain | Apr. 24, 1930 |